May 9, 1933.   G. REISINGER   1,907,872
HEADLIGHT PILOT
Filed July 22, 1931
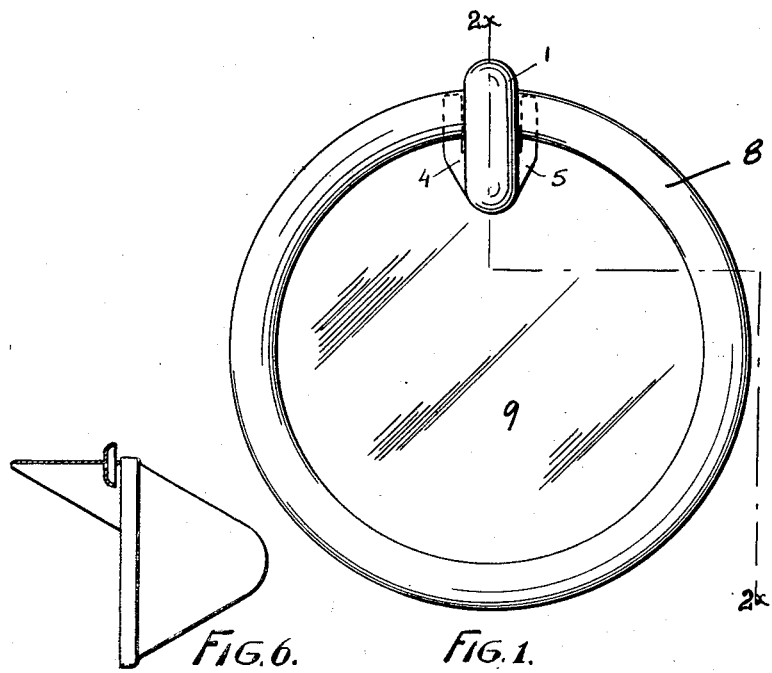
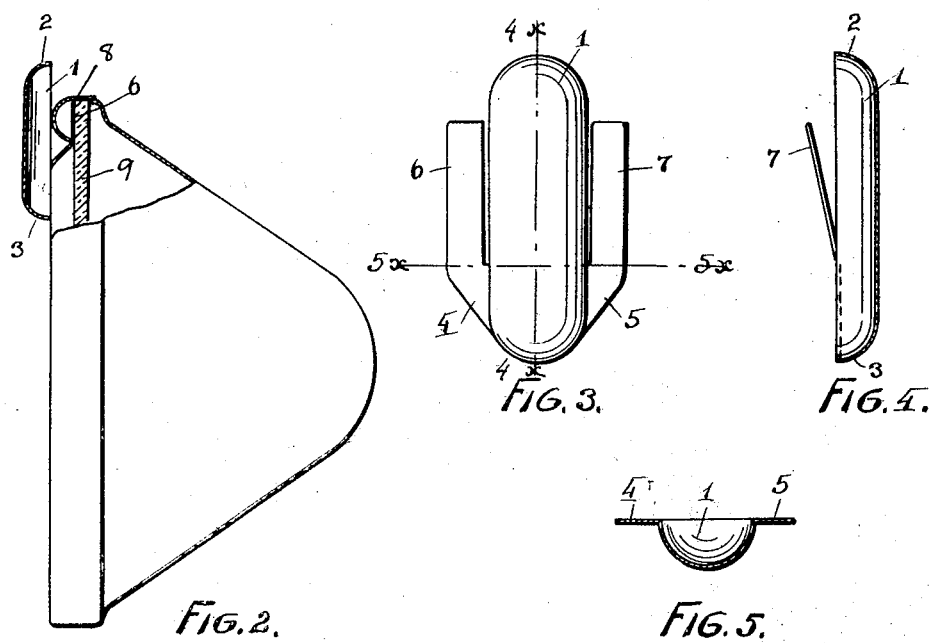
INVENTOR
GEORGE REISINGER
BY
ATTORNEY Patented May 9, 1933

1,907,872

UNITED STATES PATENT OFFICE

GEORGE REISINGER, OF ROCHESTER, NEW YORK, ASSIGNOR TO WILLIAM J. PHILLIPS, OF ROCHESTER, NEW YORK

HEADLIGHT PILOT

Application filed July 22, 1931. Serial No. 552,427.

This invention relates to headlight pilots, the function of which is to indicate to one in back of the headlight whether the light in the headlight is lighted and the object of the invention is to provide a device of this kind which is simple in construction and is easily attached to any type or size headlight.

This and other objects and attendant advantages will be apparent from the detailed description of the invention, reference being had to the accompanying drawing in which Figure 1 is a front elevation of a headlight with the pilot attached thereto.

Figure 2 is a vertical sectional view of the headlight and pilot, the section being taken on the line 2x—2x of Figure 1.

Figure 3 is an enlarged detail front elevation of the pilot.

Figure 4 is a vertical section of the pilot, the section being taken on the line 4x—4x of Figure 3.

Figure 5 is a horizontal sectional view of the pilot, the section being taken on the line 5x—5x of Figure 3.

Figure 6 is a side elevation of a headlight provided with a visor with a pilot incorporated in the visor.

In the several figures of the drawing like reference numerals indicate like parts.

The headlight pilot forming the subject matter of my present invention is formed up of suitable sheet metal into an elongated vertical trough 1 having its ends 2 and 3 rounded at the top and bottom thereof. From the sides of the trough near the lower end of it project the ears 4 and 5. These ears are provided with flexible extensions 6 and 7 which are located alongside the trough but project angularly away from it on each side thereof.

When attaching the pilot to the headlight, the ends of the extensions 6 and 7 are slipped under the rim 8 of the headlight and are held clamped between it and the lens 9. The extensions are made a predetermined length so that the outer ends thereof form stops which, when moved against the inside of the rim, position the trough member of the pilot in front of the rim so that only a predetermined portion of the pilot projects beyond the rim. In the attachment the extensions 6 and 7 are bent so as to position and hold the trough in a radial position in front of the lens and the rim with a small portion of the trough projecting beyond the rim. In this position the opening in the trough faces the rear of the head light so that some of the light rays from the reflector within the headlight fall into the lower end of the trough. This illuminates the pocket thruout its length including the outer end thereof. In the dark with the headlight lighted, the outer end of the pilot, which projects beyond the headlight, thus appears as a small illuminated trough, which is visible from the rear. By observing the projecting end of the trough, the driver of a car can thus at all times see whether or not his headlights are lighted.

In Figure 6 I have illustrated the head light pilot as part of a visor to have the visor provide a supporting means for the pilot.

I claim:

A headlight pilot for headlights having a lens surrounded by a protruding rim, comprising a vertical trough member having uniform parallel sides adapted to rest against said rim of said headlight to locate and line up its open side in a predetermined position with relation thereto and the lens which it surrounds, rigid bracket members projecting from the sides of said trough member at the lower end thereof below said rim, bendable supporting members projecting upwardly from said bracket members parallel to the sides of said trough member and bendable away from said trough member to engage under said rim of the headlight below the point of contact between said trough member and said rim in order to draw said trough member into contact with said rim and hold it fixed thereon with the lower portion of the trough member held rigid below the rim.

GEORGE REISINGER.